April 8, 1941.　　　　T. K. GREENLEE　　　　2,237,304
CONTROL FOR CONDITIONING SYSTEMS AND THE LIKE
Filed April 1, 1937　　　　3 Sheets-Sheet 1

INVENTOR
*Theodore K. Greenlee*
BY
*Parker, Carlson, Pitzner + Hubbs*
ATTORNEYS

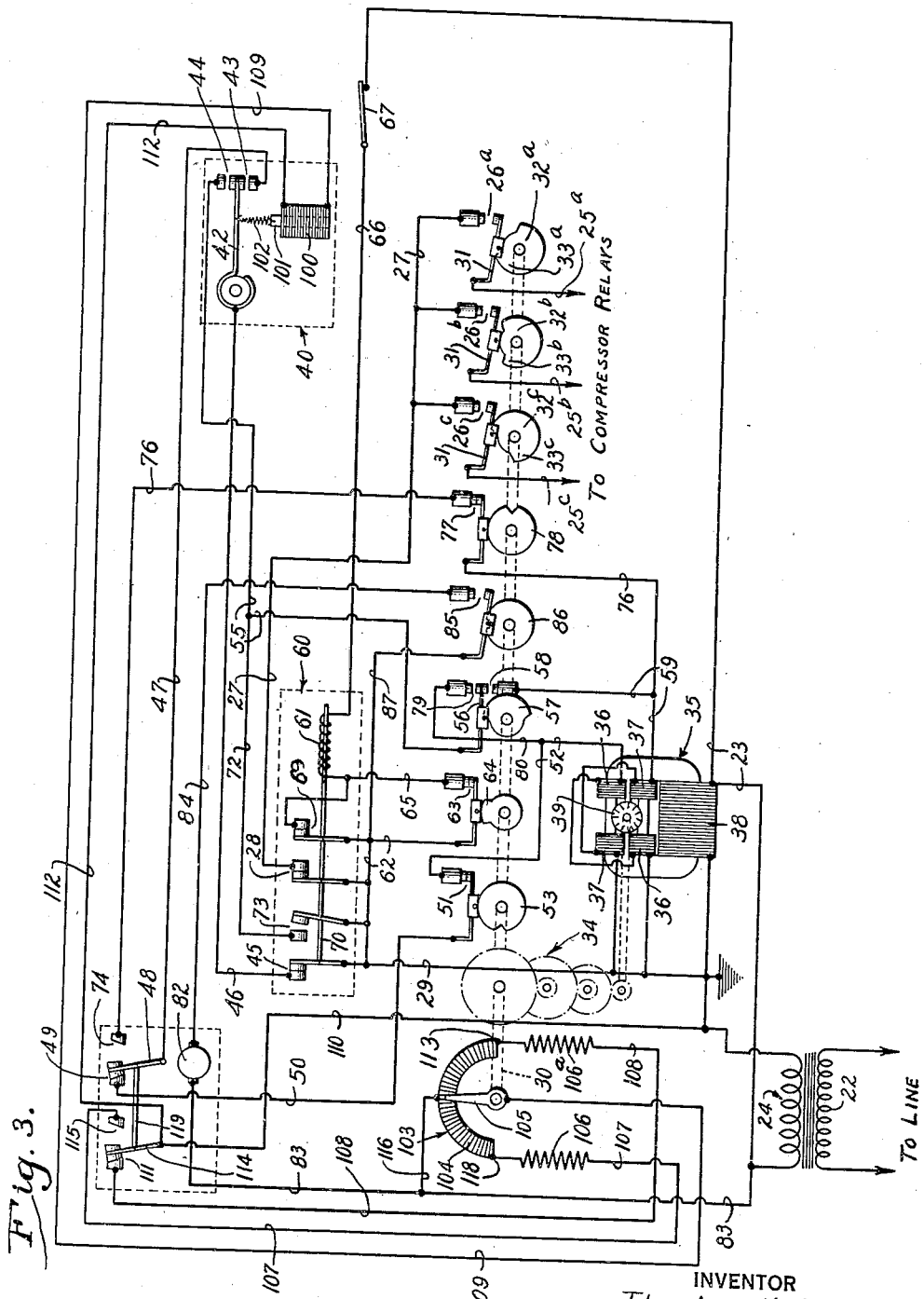

Patented Apr. 8, 1941

2,237,304

UNITED STATES PATENT OFFICE 2,237,304

CONTROL FOR CONDITIONING SYSTEMS AND THE LIKE

Theodore K. Greenlee, Rockford, Ill., assignor to Barber-Colman Company, Rockford, Ill., a corporation of Illinois Application April 1, 1937, Serial No. 134,250

12 Claims. (Cl. 62—4)

This invention relates generally to the control of apparatus for conditioning air or other medium to be controlled through the use of a plurality of power actuated units such as the compressors or solenoid valves in a cooling system which units may be rendered operative selectively to vary the aggregate conditioning capacity of the apparatus.

The general object of the invention is to program the starting and stopping of the conditioning units in a system of the above general character in a novel manner such as to correlate the number of units in operation at any time with the prevailing demand on the conditioning apparatus whereby to facilitate the maintenance of accurate temperature regulation and to avoid too frequent starting of the power driven conditioning units.

A more detailed object is to provide a control member movable varying distances away from and toward a normal rest position in accordance with the demands on the conditioning apparatus and to render the conditioning units operative in numbers corresponding to the extent of movement of the control member away from its idle position.

A further object is to provide in a system for programming the operation of a series of compressors or the like a novel means for insuring restarting of the compressors in proper sequence upon restoration of the supply of electric current following failure of such supply while a plurality of the compressors are in operation.

Still another object is to control the sequential operation of a series of power driven conditioning units in a novel manner such as to substantially equalize wear on or deterioration of the different units in prolonged service use.

Other objects and advantages of the invention will become apparent from the following detailed description taken in connection with the accompanying drawings, in which Figure 1 is a schematic view and wiring diagram of a control system embodying the present invention.

Fig. 3 is a similar view illustrating a modified form of the control.

Figure 2:
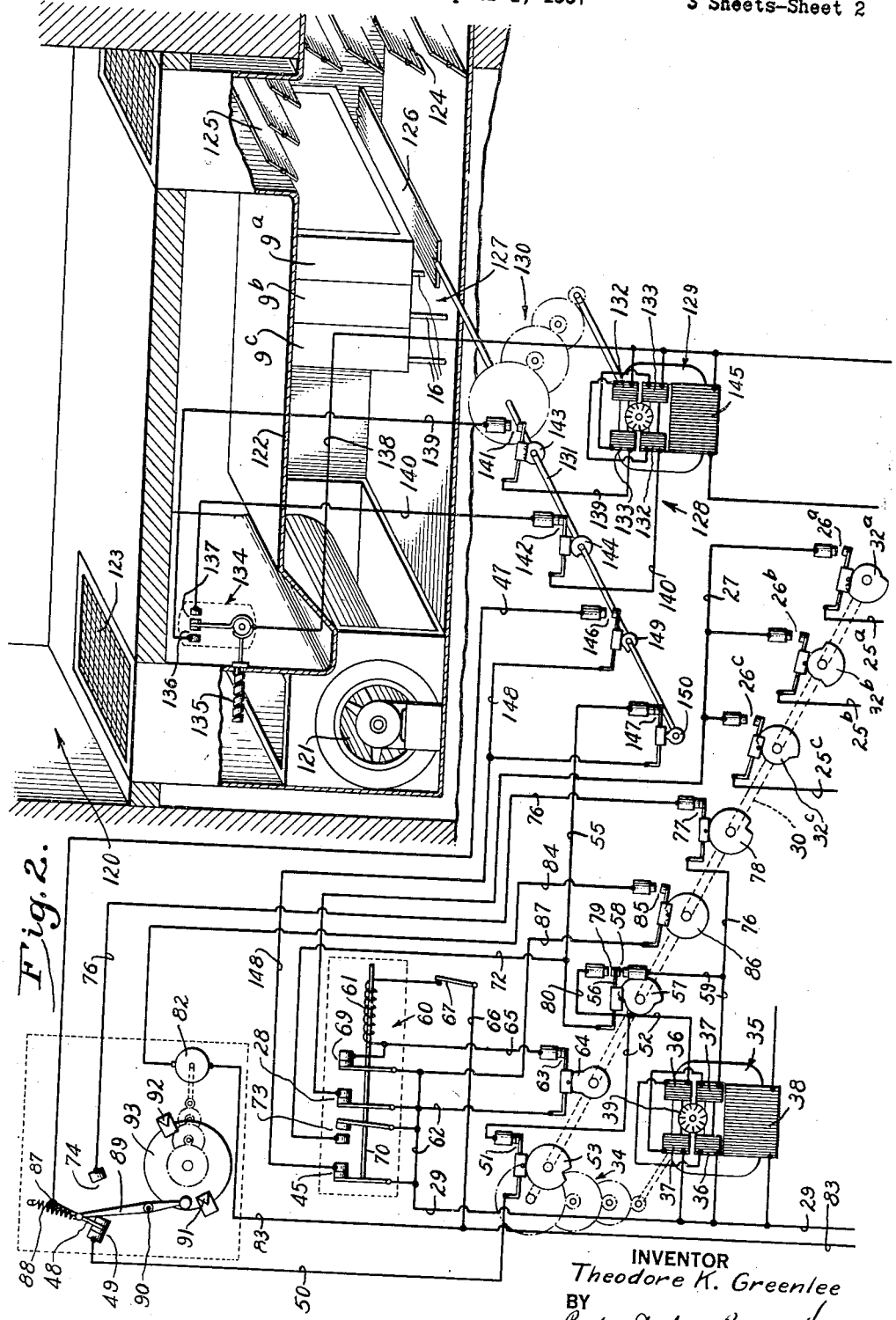
Fig. 2 is a similar schematic view showing a different application of the control shown in Fig. 1.

While the invention is susceptible of various modifications and alternative constructions, I have shown in the drawings and will herein describe in detail the preferred embodiment, but it is to be understood that I do not intend to limit the invention by such disclosure but aim to cover all modifications and alternative constructions falling within the spirit and scope of the invention as expressed in the appended claims.

For purposes of illustration, the invention will be described in connection with the control of systems for cooling a medium to be conditioned so as to maintain the same at a substantially uniform temperature. In the form shown in Fig. 1, the control is utilized to govern the selective operation of a plurality of refrigerating units $17^a$, $17^b$, and $17^c$ for delivering cooling medium through pipes 16 to coils $9^a$, $9^b$, and $9^c$ by which water in a tank 15 is cooled. The cooled water may be used, for example, in a system for cooling air to be delivered to a space 5 to be conditioned. For this purpose, the water may be circulated through a heat exchanger 6 by a pump 7 under the control of a three way valve 8. Positioning of the valve to circulate water either through the exchange 6 or a by-passage 4 may be effected by a power operator 10 controlled by a thermostat 11 in the space 5.

The refrigeration units $17^a$, $17^b$ and $17^c$ comprise compressors $18^a$, $18^b$ and $18^c$ each driven by an individual electric motor 19. The number of such units will of course vary with the individual capacities of the units selected, but in any case the total number will be such as to provide an aggregate cooling capacity when all of the units are in operation preferably exceeding the maximum cooling demand that is likely to be imposed upon the apparatus. By starting and stopping the compressors one at a time, the cooling capacity of the apparatus as a whole may be increased and decreased as desired in increments governed by the capacities of the individual compressors.

The compressor motors 19 are arranged to be energized from a high voltage source 22 of current under the control of magnetic relay switches $20^a$, $20^b$ and $20^c$ arranged in the circuits for the respective motors 19 and adapted to be closed by the energization of windings $21^a$, $21^b$ and $21^c$. Herein one terminal of these windings is connected to a conductor 23 leading to a low voltage current source 24 and the other terminals extend through branch conductors $25^a$, $25^b$ and $25^c$ each having interposed therein a control switch $26^a$, $26^b$ and $26^c$. Beyond these switches the conductors 25 are joined to a common conductor 27 leading through a switch 28 to the other power conductor 29.

The present invention contemplates program-ming the operation of the switches 26 in a manner such as to establish an approximate balance between the number of power units such as compressors in operation at any time and the prevailing cooling demand on the system. Generally stated, this is accomplished through the use of a control member in the form of a cam shaft 30 which, when there is no demand for cooling, occupies the idle rest position shown in Fig. 1 but which, when there is a demand, is moved away from this rest position and modulated back and forth in accordance with the changing demand. In such movement, the member actuates the switches 26 to start and stop the compressors one at a time and at intervals spaced in a manner later to be described, the number of the compressors in operation at any time being determined by the extent of movement of the control member away from its idle or off position.

In the form shown in Fig. 1, the switches 26$^a$, 26$^b$, and 26$^c$ are closed successively at spaced points in nearly a half revolution of angular movement of the cam shaft 30 in a clockwise direction away from the idle position and are opened in reverse order and at the same positions of the cam shaft as the latter moves back to its rest position. To this end, the movable contacts of the switches are carried by followers 31 engaging cams 32$^a$, 32$^b$, and 32$^c$ fast on the shaft 30. A lobe 33$^a$ on the cam 32$^a$ operates to close the switch 26$^a$ as the cam shaft 30 leaves its rest position in turning in a clockwise direction and maintains this switch closed through the range of movement of the cam shaft in this direction. The cam 32$^b$ has a similarly shaped lobe 33$^b$ which causes closure of the switch 26$^b$ after the shaft 30 has turned through approximately a quarter revolution while a lobe 33$^c$ on the cam 32$^c$ effects closure of the switch 26$^c$ near the end of the half revolution of the shaft.

To effect proper timed operation of the cam shaft 30, the latter is preferably driven through appropriate speed reduction gearing 34 by a reversible motor 35 having windings 36 and 37 energizable selectively to determine the direction and extent of movement of the cam shaft. The motor shown is of the shaded pole induction type having a main winding 38 constantly energized from the source 24 of alternating current with the windings 36 and 37 constituting multiple turn shading coils arranged about the rotor 39 as shown so as to cause clockwise movement of the shaft 30 when the windings 36 are short-circuited and counter-clockwise movement when the windings 37 are effective, the shaft 30 being held at rest when both sets of windings are ineffectual.

Control of the motor 35 to effect positioning of the shaft 30 in accordance with varying demands on the cooling system may be effected in various ways well understood in the art. In the form shown in Fig. 1, the motor is within the direct control of a thermostat 40 which is arranged with its sensitive element 41 responsive to the temperature of the water in the tank 15.

The thermostat shown is of the ordinary double switch type having a tongue 42 movable between spaced contacts with which the tongue cooperates to form switches 43 and 44. The switch 43 is closed when the temperature of the thermostatic element 41 rises to a predetermined temperature depending on the setting of the thermostat while the switch 44 is closed as the thermostat detects a somewhat lower temperature. When the temperature of the element 41 is at the intermediate range, the tongue 42 will stand between the contacts, both of the switches being held open.

The shading coils of each set 36 and 37 are connected in series relation, and one terminal of each set is connected to the thermostat tongue through the conductor 29, a switch 45 which is closed during normal operation of the system, and a conductor 46. The stationary contact of the switch 43 is joined by a conductor 47 to a switch arm 48 which cooperates with a stationary contact to form a switch 49. The stationary contact leads to the insulated terminal of the windings 36 through a conductor 50, a limit switch 51, and a conductor 52. The switch 51 is maintained closed by a cam 53 on the shaft 30 until the latter has turned clockwise nearly through a half revolution from the normal rest position shown whereupon the cam follower encounters a notch in the cam which allows the switch to open, this being after the third compressor 18$^c$ has been started by closure of the switch 26$^c$. The stationary contact of the thermostat switch 44 is connected by a conductor 55 to the follower 56 of a cam 57 on the shaft 30 which follower cooperates with a stationary contact to form a switch 58, the latter contact being joined to the insulated terminal of the windings 37 by a conductor 59. The cam 57 is shaped as shown to open the switch 58 as the cam shaft 30 returns to its rest position and to permit closure of this switch as the lowest part of the cam is presented to the follower in the initial clockwise movement of the shaft out of this position thereby placing the coils 37 within the control of the thermostat switch 44.

Assuming that the switches 28 and 45 are closed as will be the case under normal operating conditions, and that the parts are positioned as shown in Fig. 1, the control mechanism thus far described operates in the following manner. As long as the thermostat tongue 42 stands between its cooperating contacts, the motor 35 will remain at rest with the cam shaft 30 in its off position, and all three of the compressors will be idle. When there is a demand for cooling as evidenced by a rise in the water temperature sufficient to close the switch 43, the short circuit for the shading coils 36 will be completed through the conductor 29, the switch 45, conductor 46, switch 43, conductor 47, switch 49, conductor 50, switch 51, and conductor 52. In the initial part of the ensuing clockwise movement of the cam shaft 30, the switch 26$^a$ will be closed by the cam 32$^a$ thereby energizing the relay winding 21$^a$ and starting the compressor 17$^a$. As a result, cooling medium will be supplied to the coil 9$^a$, and the apparatus will be conditioned to operate at minimum cooling capacity. In the same cam shaft movement, the limit switch 58 is closed by the cam 57 thereby preparing the short circuit for the motor windings 37.

If the demand for cooling continues for the interval required for movement of the cam shaft through a quarter of a revolution, the switch 26$^b$ will be closed by the cam 32$^b$ thereby starting the second compressor 18 and accordingly increasing the cooling capacity of the apparatus by another increment. If with the two compressors operating the cooling demand is satisfied before the cam shaft 30 reaches the position at which the switch 26$^c$ is closed, the switch 43 will be opened stopping the timing motor 35. Both compressors 18$^a$ and 18$^b$ will continue to operate and the shaft 30 will remain at rest.

Assume now that the water temperature falls causing closure of the switch 44. In such a case, the windings 37 will be short-circuited through the conductor 59, the then closed switch 58, the conductor 55, the switch 44, the conductor 46, the switch 45, and the conductor 29. This starts the motor to cause counter-clockwise rotation of the shaft. When the shaft has been moved to the position at which the switch 26$^b$ is allowed to open, the compressor 18$^b$ will be stopped. In the event that the condition of overcooling is relieved by such a reduction in the capacity of the apparatus, the switch 44 will be opened before the cam shaft shuts off the first compressor 18$^a$.

When a maximum demand is imposed on the system, the switch 43 may remain closed for a sufficient length of time to permit clockwise movement of the cam shaft through a full half revolution and to the limit position at which the switch 51 is opened. If such movement begins with the cam shaft in normal rest position, the three compressors 18$^a$, 18$^b$, and 18$^c$ will be started successively at spaced intervals of time depending on the speed of the shaft and the spacing of the active portions of the cam lobes. With the three refrigerating units running, the apparatus will operate at full capacity until the demand is satisfied.

From the foregoing, it will be apparent that the control shaft 30 will oscillate back and forth under the control of the thermostat turning on the compressors 18$^a$, 18$^b$, and 18$^c$ in moving clockwise and stopping these in reverse order as the cam shaft moves through a full half revolution counter-clockwise. By such modulating control, the shaft becomes positioned in accordance with the prevailing demand for cooling. Since the number of compressors operating at any time is determined by the deviation of the cam shaft from the normal rest position, the capacity of the apparatus will be varied from time to time and adjusted to approximately balance the prevailing cooling demand. Such a floating control of the group of compressors not only facilitates the maintenance of close temperature regulation but also prevents too frequent starting and stopping of the compressors.

The lengths of the intervals of time measured by movement of the cam shaft 30 and intervening between the starting of successive compressors in response to a continuous movement of the shaft will of course vary considerably with different operating conditions. Among the factors influencing this timing are the location of the controlling thermostat, the size of the compressors, and the rate of change of the temperature in the conditioned space in response to a change of one increment in the cooling capacity. In any case, however, the interval will be of sufficient length so that the change in cooling capacity resulting from starting or stopping one compressor will be felt at the thermostat before the next compressor is started or stopped. Ordinarily, the intervals between the actuation of the adjacent control switches will be of several minutes' duration.

In accordance with the present invention, provision is made for preventing simultaneous starting of a plurality of the compressors upon restoration of the current supply following a power failure and for utilizing the compressor control mechanism above described in restarting the compressors in proper sequence. To this end, a magnetic relay 60 is provided to detect the failure of the power supply and in response thereto disable the compressors against restarting, to withdraw the timing motor from the control of the thermostat switch 43, and to short-circuit the windings 37 independently of the thermostat switch 44 so as to cause return of the cam shaft toward its off position when the power supply is again restored.

The relay 60 includes a winding 61 which is normally energized during operation of the system but which is locked out after becoming deenergized when the cam shaft is beyond the position at which more than one control switch 26 is closed. This may be accomplished, for example, by providing an energizing circuit which extends from the source 24 through the conductor 29, a conductor 62, a switch 63 which is closed by a cam lobe 64, a conductor 65, the winding 61, a conductor 66, a switch 67 which may be closed and opened by hand to start and stop the cooling apparatus and a conductor 83 leading to the other power terminal. While the lobe 64 may, if desired, be formed to necessitate complete return of the cam shaft to its off position before closure of the switch 63, it is preferably shaped to effect closure of the switch shortly after the cam shaft has been returned past the point at which the switch 26$^b$ is actuated.

When the winding 61 is initially energized, its armature 70 moves against the tension of a spring 70$^a$ closing a switch 69 to connect the conductors 62 and 65 and thereby establish a holding circuit for the winding. The movable contacts of the switches 28 and 45 are also connected to the armature so that these switches will be closed when the relay is energized and opened in response to power failure. Interposed in a conductor 72 connecting the conductors 62 and 55 is a switch 73 which is held open when the relay 60 is energized and closed in response to the detection of a power failure.

The auxiliary control above described operates in the following manner assuming that the power fails when the cam shaft 30 is in position to maintain operation of the two compressors 18$^a$ and 18$^b$. The resulting deenergization of the winding 61 causes the switch 28 to open thereby disabling the compressors against restarting, opening of the switch 45 to withdraw the motor winding 36 from the control of the thermostat, and interruption of the holding circuit through the switch 69 so that the winding cannot be reenergized until the switch 63 has been reclosed. At the same time, the switch 73 is closed thereby preparing an independent short-circuit for the shading coils 37 through the conductors 29 and 62, the switch 73, the conductors 72 and 55, the then closed switch 58 and the conductor 59.

With the parts thus conditioned, the only effect of restoration of the power supply will be to energize the motor 35 and initiate counterclockwise rotation of the shaft 30 thereby. Such rotation continues with the compressors idle until the shaft 30 has been returned beyond the position at which the switch 26$^b$ is actuated. Then, in response to closure of the switch 63, the winding 61 is energized to open the switch 73 and close the holding switch 69, and the switches 28 and 45. At this time, the thermostat will, due to the period of inoperativeness of the apparatus, usually be calling for cooling. As a result, the windings 36 will be short-circuited to initiate clockwise movement of the shaft 30 which will continue until the proper number of the compressors have been started in the normal way previously described. The control mechanism is thus restored to the control of the thermostat and the compressors are started one at a time and at spaced intervals thereby avoiding overloading of the power circuits and operation of each compressor at full speed before the next one is started.

Provision is also made for controlling the sequential starting and stopping of the compressors in a manner such as to substantially equalize mechanical wear thereon, that is to say, in spite of the fact that the compressors are started in a timed sequence, the periods of operation of the different compressors are maintained substantially uniform over a prolonged period of service use. In this present instance, this auxiliary control is effected automatically by reversing the sequence of starting and stopping of the compressors after a predetermined aggregate period of operation of the compressors. To simplify this control, such change in sequence is obtained by reversing the connections between the thermostat switches and the shading coils and providing a second set of cam surfaces on the shaft 30 arranged to operate the various switches in the manner previously described but during rotation of the shaft through a half revolution counterclockwise from the normal rest position shown.

Reversal of the thermostat connections is effected by opening the switch 49 and closing a switch 74 thereby breaking the connection between the conductors 47 and 50 and connecting the conductor 47 to a conductor 76 leading to the conductor 59. In this way, the shading coils 37 are placed in control of the thermostat switch 43 so that the motor 35 will, when the thermostat calls for cooling, operate in a direction to turn the shaft 30 counter-clockwise. A switch 77 is interposed in the conductor 76 and is arranged for operation by a cam 78 having a notch therein by which the counter-clockwise movement of the shaft from the rest position is limited after the three switches 26$^c$, 26$^b$, and 26$^a$ have been closed in succession. To place the shading coils 36 within the control of the thermostat switch 44 when the shaft 30 turns counter-clockwise out of its idle position, the follower 56 cooperates with a second stationary contact to form a switch 79 which is closed by the highest part of the cam 57 in the initial counter-clockwise movement of the cam shaft. Closure of the switch 79 connects the conductor 55 to a conductor 80 leading to the conductor 52.

The cams 32$^a$, 32$^b$, and 32$^c$ are shaped as shown to provide second surfaces which operate the switches 26 at the same times in the counter-clockwise movement of the shaft but in reverse order. That is to say, the switch 26$^c$ is closed and the compressor 18$^c$ started as soon as the cam shaft leaves the rest position, the switch 26$^b$ is closed after a quarter revolution, and the switch 26$^a$ is closed near the end of the half revolution. The switch 63 is operated in the same way regardless of the direction of movement of the shaft from its idle position.

When the connections are thus reversed, oscillation of the shaft 30 takes place in the same manner as that first described except that the shaft is turned counter-clockwise in response to a call for cooling evidenced by closure of the switch 43 and clockwise when the switch 44 is closed. The short circuit for the coils 37 is through the conductors 59 and 76, switch 77, conductor 76, switch 74, conductor 47, switch 43, conductor 46, switch 45, and conductor 29. Closure of the switch 44 when the thermostat calls for less cooling short-circuits the shading coils 36 through the conductors 52 and 80, then closed switch 79, conductor 55, switch 44, conductor 46, switch 45, and conductor 29.

While operation of the switches 49 and 74 to reverse the connections between the thermostat switches and the motor shading coils may be effected in various ways, it is preferred to provide for automatic reversal of the connections at the end of a predetermined period of operation of any one or more of the compressors. To this end, provision is made for actuating the switch arm 48 from an auxiliary timing motor 82 which is operated whenever the cam shaft 30 is out of its normal idle position, this being utilized as an indication that at least one of the compressors is in operation. The circuit for the motor 82 extends from the current source 24 through a conductor 83, the motor 82, a conductor 84, a switch 85, and conductors 87 and 29 leading to the other power terminal. The switch 85 is open as shown when the cam shaft is in its idle position and is closed by a cam 86 when the shaft is in any other position.

Actuation of the switch arm 48 by the motor 82 may be effected in various ways. Herein, the arm is pivoted at 87 and urged by an over-center spring 88 against one or the other of the stationary contacts of the switches 49 and 74. Connected to the arm 48 is a lever 89 pivoted at 90 with its lower arm positioned for engagement by diametrically positioned cams 91 and 92 on a rotary disk 93. The disk is driven by an appropriate gearing from the timing motor 82, the arrangement preferably being such that the disk rotates clockwise through one revolution during any selected period, for example, twenty-four hours.

When the cam 91 engages the follower, the arm 48 is swung over-center thereby opening the switch 49 and closing the switch 74. This switch remains closed for a twelve hour operating period whereupon the follower is engaged by the cam 92 and shifted over-center in the opposite direction to open the switch 74 and close the switch 49.

In some types of conditioning systems, the programming mechanism may be controlled indirectly and in response to the movements of a regulating device which in turn is controlled by a sensitive instrument. Fig. 2 illustrates such an application, corresponding reference numbers being applied to the parts in common with the apparatus shown in Fig. 1. This system is for cooling a mixture of fresh and return air and delivering the same at a uniform temperature to a space 120 such as the room of a building. The fresh and return air are drawn by a power driven blower 121 through a duct 122 and caused to pass in heat-exchanging relation with respect to a series of cooling coils 9$^a$, 9$^b$, and 9$^c$ before being discharged from the duct outlet 123. The proportions of fresh and return air are determined by dampers 124 and 125 which may be positioned in any desired manner.

Cooling medium is delivered to the coils 9 by the refrigerating units 17 in the manner previously described, and the cooling action thereof on the air passing through the duct 122 is determined not only by the number of coils in operation at any time but also by the position of a damper 126 disposed in a by-passage 127 around the coils. Preferably, the damper is arranged to be actuated with a modulating movement by a reversible electric operator 128 having a motor 129 constructed similar to the motor 35 and operating through gearing 130 to oscillate the damper operating shaft 131 varying distances back and forth through a quarter revolution. Starting of the operator 128 to close the damper is initiated by short-circuiting shading coils 132 of the motor and reverse movement, that is to open the by-passage, occurs while the shading coils 133 are effectual.

In the present instance, the damper operator is under the direct control of an instrument in the form of a thermostat 134 responsive to the temperature of the air passing through the duct outlet 123 and having a thermal element 135 arranged to close a switch 136 when the temperature falls below that for which the thermostat is set to respond. A switch 137 of the thermostat is closed when the temperature rises above the operating range of the thermostat. The common contact of the thermostat switches is connected to the common terminal of the windings 132 and 133 by a conductor 138, and the insulated contacts are connected by conductors 139 and 140 to the insulated terminals of the respective windings. Switches 141 and 142 opened by cams 143 and 144 when the damper is in limit open and closed positions respectively are interposed in the conductors 139 and 140. The main winding 145 of the motor is constantly energized.

With the operator arranged to be controlled in this manner, the thermostat governs the extent as well as the direction of movement of the damper which thereby oscillates varying distances back and forth according to the demand determined by the thermostat. The damper will be maintained by its operator in any intermediate position while both of the thermostat switches are open.

Movement of the damper 126 to its closed position constitutes an indication that the existing cooling capacity of the coils 9 is insufficient to meet the existing demands on the system, and this movement is utilized in accordance with the present invention to initiate operation of the program motor 35 in a direction to cause more of the compressors to be started. Similarly, movement of the damper 126 to fully open position constitutes an indication that too much cooling medium is being supplied to the coils 9, and such movement is utilized to initiate movement of the program shaft 30 to reduce the number of compressors in operation. The arrangement is also such that when the damper is disposed at any intermediate position, the program shaft 30 will remain idle thereby maintaining a fixed aggregate cooling capacity of the coils 9, accurate variation of the cooling effect being obtained by moving the damper 126 back and forth.

To these ends, the shading coils 36 and 37 of the motor 35 are arranged to be energized selectively by closure of switches 146 and 147 which have a common terminal connected by a conductor 148, the switch 45, and conductor 29 to the common terminal of the windings 36 and 37. The insulated terminals of these switches are connected to the conductors 47 and 55 which, as previously described, lead to the windings 36 and 37 respectively when the parts are conditioned as shown in Figs. 1 and 2. A cam 149 on the damper shaft 131 operates to maintain the switch 146 open in all positions of the damper except the fully closed position when the switch is closed by the cam. In a similar way, a cam 150 operates to close the switch 147 as the damper approaches its open position and to maintain this switch open in all other positions of the damper.

It will be apparent that the switches 146 and 147 are arranged to control the motor 35 of the programming mechanism in the same manner as the thermostat switches 43 and 44 in the system shown in Fig. 1. Briefly, the program shaft 30 remains idle while the damper 131 is disposed intermediate its limit positions. If, due to an increased demand for cooling, the thermostat switch 137 remains closed for a sufficient length of time to permit movement of the damper 126 to its fully closed position, the switch 146 will be closed and the motor 35 started in a direction to increase the number of compressors in operation. After another compressor has been started and the cooling capacity of the coils 9 thus increased, the cooling requirement of the thermostat 134 may be satisfied, in which case the switch 136 will be closed thereby starting the damper toward open position. This results in opening of the switch 146 and stopping of the shaft 30 with the latter positioned to maintain the additional compressor in operation. Then, the damper movement is modulated to effect accurate changes in the cooling effect of the coils. If, with the additional compressor in operation, the damper 126 eventually moves to a fully open position as shown in Fig. 2, the switch 147 becomes closed which initiates reverse movement of the program shaft 30 in a direction to reduce the number of compressors in operation. The movement of the shaft is arrested as soon as the damper 126 again moves away from open position. In this way, the amount of cooling medium delivered to the coils 9 is varied in predetermined stages determined by the capacities of the different compressors and in accordance with the prevailing cooling demand which is determined by the movements of the damper 126 under the control of the thermostat 134.

Fig. 3 shows a modification of the control in which the program shaft 30 is positioned in accordance with the degree of cooling demand, that is, the deviation of the temperature of the controlling thermostat from the predetermined value which it is desired to maintain. This form of the invention embodies all of the essential parts numbered to correspond to Fig. 1 and operating in the manner above described except that the cam shaft is arranged for oscillation through quarter revolutions instead of half revolutions on either side of its normal rest position. The thermostat 40 is in the room or space being conditioned.

Positioning of the shaft 30 in the preferred manner is effected in the present instance through the provision of means for varying the effective control point of the thermostat 40 through a comparatively narrow temperature range and substantially instantaneously with changes in the position of the cam shaft. The means shown herein for this purpose comprises a magnet 100 of the solenoid type mounted adjacent but insulated from the thermostat and having an armature 101 connected through the medium of a light contractile spring 102 to the tongue 42 of the thermostat. The solenoid exerts on the tongue a light mechanical force determined by the degree of solenoid energization and acting to vary the control point of the thermostat, that is to say, to cause the tongue to be disposed between the stationary contacts at lower or higher temperatures of the air surrounding the thermostatic element.

The solenoid 100 is maintained energized continuously during the operation of the cooling system, the degree of energization being governed, for example, by a potential dividing rheostat 103 comprising a resistance element 104 and a contact arm 105 carried by the cam shaft 30 and engaging the center of the resistance element when the shaft is in the idle position shown. The terminals of the resistance element 104 are connected through fixed resistances 106 and 106ª to conductors 107 and 108 which lead to the terminals of switches 115 and 111. The common terminal of the latter is connected by a conductor 110 to one side of the low voltage power source 24. The central point of the resistance element 103 is connected by a conductor 116 to the power conductor 83.

Assuming that the switch 111 is closed as shown, the circuit for the solenoid 100 extends from its winding through a conductor 109, the arm 105, a portion of the resistance 104, the resistance 106ª, the conductor 108, the switch 111, and the conductor 112. Thus, the energization of the solenoid at any time is determined by the voltage drop between the arm 105 and the rheostat terminal 113.

During the clockwise movement of the cam shaft 30 from the position shown in Fig. 3 due to closure of the thermostat switch 43 in the manner above described, the voltage applied to the solenoid 100 decreases progressively as the arm 105 swings toward the terminal 113 thereby imposing less and less tension on the thermostatic element according to the extent of such movement. This results in an increase in the thermostat control point, that is, in the temperature range at which the tongue 42 will stand between the fixed contacts. Accordingly, as the shaft 30 turns clockwise, the cooling demand determined by the controlling thermostat decreases progressively to a small degree so that the switch 43 will open at progressively higher temperatures of the thermostat. Similarly, when the shaft turns counter-clockwise toward the idle position shown, the solenoid current will increase and the control point of the thermostat will be decreased.

By thus varying the thermostat control point, the distance the shaft 30 is displaced from the idle position shown will always be proportional to the degree of deviation of the space temperature from the lower limit of the operating range of the thermostat which may be adjusted in accordance with the range desired to be maintained in the space. Thus, if the thermostat is set for 70 degrees Fahrenheit, and the solenoid is arranged to change the control point three degrees during movement of the shaft 30 through a quarter of a revolution, the operation of the system would be as follows.

As long as the space temperature remains at 70 degrees, the switches 43 and 44 would be held open, the shaft 30 being in its idle position. When the room temperature rises and closes the switch 43, clockwise rotation of the shaft is initiated resulting in starting of the compressor 18ª. In the continued movement of the shaft, the current flow in the solenoid 100 decreases slowly causing the control point of the thermostat to be raised. If at this time the demand for cooling is small, the switch 43 will open after a short movement of the shaft. If, however, there is a large demand as evidenced by a rise in room temperature above 71.5 degrees, clockwise rotation of the shaft 39 will continue until after the second compressor has started. Similarly, if the room temperature approaches the upper limit of its control range, that is 73 degrees, the shaft will be permitted to move through its full range of ninety degrees to start the third compressor 18ᶜ.

Similar action takes place during movement of the shaft 30 toward its idle position, in which case, the degree of energization of the solenoid increases progressively. Thus, the control member or shaft 30 floats back and forth under the control of the thermostat and is always positioned away from its normal idle position a distance corresponding to the amount the space temperature deviates from the 70 degree value.

Positioning of the program controlling member in this manner is advantageous for use in systems where the rate at which the temperature may change is relatively high but the response to the thermostat is relatively slow. This type of control also enables the interval required for movement of the shaft 30 through its full range to be reduced substantially thereby reducing the periods of shutdown preparatory to restarting of the compressors upon restoration of the power supply following a failure thereof with several of the compressors in operation.

To provide for proper operation of the solenoid 100 when the thermostat connections are reversed in the manner above described to change the sequence in which the compressors are started and stopped, provision is made for decreasing the energization of the solenoid 100 as the cam shaft 30 is turned counter-clockwise from its normal idle position shown. This is accomplished by shifting the switch arm 114 to open the switch 111 and close the switch 115 thereby connecting the rheostat terminal 118 to the current source. The switch arm 114 is connected by a link 119 to the switch arm 48 so that the switch 115 will be closed when the switch 49 is opened and the switch 74 closed to reverse the thermostat connections.

With the solenoid circuit thus conditioned, the degree of energization of the solenoid 100 will be determined by the voltage drop between the contact arm 105 and the terminal 118, the current decreasing progressively as the shaft 30 turns counter-clockwise away from the idle position and increasing progressively as the shaft turns back to such position. Thus, the modifying action on the thermostat is the same regardless of the direction in which the shaft 30 moves away from its off position.

If desired, the switches 111 and 115 may be omitted and the fixed resistances 106 and 106ª connected directly to the grounded side of the power source. In such a case, the degree of energization of the solenoid 100 during clockwise movement of the shaft 30 would be proportional to the voltage drop across the resistance 106ª plus the drop across that portion of the element 104 between the arm 105 and the terminal 113. Similarly, the energization of the solenoid would decrease progressively as the arm 105 turns counter-clockwise from the idle position shown. This arrangement, however, would require twice the energizing current as that shown in Fig. 3.

I claim as my invention:

1. In a conditioning apparatus having a plurality of power actuated devices, the combination of a control member movable in opposite directions away from a predetermined position and operable upon movement out of said position to render said devices active in different predetermined sequences depending on the direction of such movement of the member away from said predetermined position, a reversible motor for actuating said member, conditioning responsive means having operative connections with said motor and controlling the motor to modulate the movements of said member, and independently operable means by which the connections between said last mentioned means and said motor may be reversed whereby to reverse the direction of movement of said member in response to a given condition of said condition responsive means.

2. In combination with a plurality of devices for varying the capacity of a conditioning apparatus, a movable control member adapted to occupy a normal rest position, power driven means for oscillating said member varying distances back and forth on either side of said normal position, means by which the range of oscillation of said member may be changed from one to the other side of said normal position, and means for rendering said devices operative successively as said member moves progressively increasing distances away from said position through either of said ranges.

3. In combination with a plurality of devices for varying the capacity of a conditioning apparatus, a movable control member adapted to occupy a normal rest position, means operable upon movement of said member in either direction away from said rest position to render said devices active in a predetermined sequence, a reversible motor for actuating said member, means responsive to a predetermined demand on said apparatus to initiate operation of said motor in one direction, and independently operable means by which said motor may be caused to operate in a reverse direction in response to said predetermined demand.

4. In a conditioning system having a plurality of power driven compressors, the combination of means for starting said compressors successively and establishing an approximate balance between the number of compressors in operation and the conditioning demand on said system, and automatically operating means to vary the sequence of starting of the compressors in response to a prolonged demand whereby to distribute wear between the different compressors.

5. The combination of a plurality of power operated devices governing the capacity of a conditioning apparatus of, control means for rendering said devices operative sequentially, a timing mechanism arranged to operate when any one or more of said devices is in operation, and means actuated at intervals measured by said mechanism for changing the order of operation of said devices by said control means.

6. The combination with a plurality of power driven compressors of, selectively operable means for starting said compressors successively in different sequences, means for selecting one of said sequences including a timing motor, and means operating automatically to run the motor while any one or more of said compressors is operating and to render the motor drive ineffectual when all of said compressors are idle.

7. In combination with air conditioning apparatus, a member movable in either direction from a normal idle position, means actuated by said member in moving away from said position in either direction to increase the conditioning capacity of said apparatus according to the extent of such movement, a power actuator for said member, a sensitive instrument controlling said actuator to modulate the movements of said member on either side of said idle position, an electromagnet associated with and arranged to modify the action of said instrument according to its degree of energization, and two rheostats selectively operable according to the direction of movement of said member away from said position to produce similar variations in the energization of said magnet regardless of the direction of movement of the member.

8. In a control apparatus of the general character described, the combination of a member movable in either direction from a normal idle position, means actuated by said member oscillating within a range on either side of said position in either direction to vary the conditioning capacity of said apparatus, a power actuator for said member, an instrument controlling said actuator to modulate the movements of said member on either side of said position, and means responsive to the movements of said member for similarly modifying the action of said instrument according to the extent of movement of said member from said position in each of said directions.

9. In combination with conditioning apparatus, a member movable in either direction from a normal idle position, means actuated by said member while oscillating within a range on either side of said position to vary the conditioning capacity of said apparatus, a power actuator for said member, a condition responsive instrument controlling said actuator to modulate the movements of said member on either side of said position, means for modifying the action of said instrument, a plurality of means each controlling said modifying means to effect positioning of said member by said instrument varying distances away from said position according to the deviations in the condition of said instrument from a predetermined value, and automatic means for rendering said last mentioned means operative selectively depending on which side of said idle position said member oscillates.

10. In combination with conditioning apparatus, a member movable in either direction from a normal idle position, means actuated by said member in moving away from said position in either direction to increase the conditioning capacity of said apparatus according to the extent of such movement, a power actuator for said member, a thermostat controlling said actuator to modulate the movements of said member on either side of said idle position, an electromagnet arranged to modify the action of said thermostat according to its degree of energization, and means responsive to the movements of said member and operating to produce similar variations in the energization of said magnet during the movements of said member in either direction away from said idle position.

11. For controlling the operation of a plurality of electrically operated compressors in a conditioning apparatus, a control system having, in combination, condition responsive means, mechanism controlled thereby normally acting to start and stop said compressors one at a time and at spaced time intervals to establish a balance between the number of compressors in operation and the conditioning demand on said apparatus, and means operable upon restoration of power following a failure thereof when a plurality of said compressors are in operation to condition said mechanism for restarting the compressors in the normal spaced sequence.

12. For controlling the operation of a plurality of electrically operated compressors in a conditioning apparatus, a control system having, in combination, condition responsive means, mechanism controlled thereby normally acting to start and stop said compressors one at a time and at spaced time intervals to establish a balance between the number of compressors in operation and the conditioning demand on said apparatus, and means operable upon restoration of power following a failure thereof when a plurality of said compressors are in operation to maintain said compressors disabled until said mechanism has been reconditioned for restarting of the compressors in the normal sequence.

THEODORE K. GREENLEE.